Dec. 21, 1965   E. P. WARNKEN   3,224,374
NOSE CAP FOR A RE-ENTRY BODY
Filed March 9, 1960   3 Sheets-Sheet 1
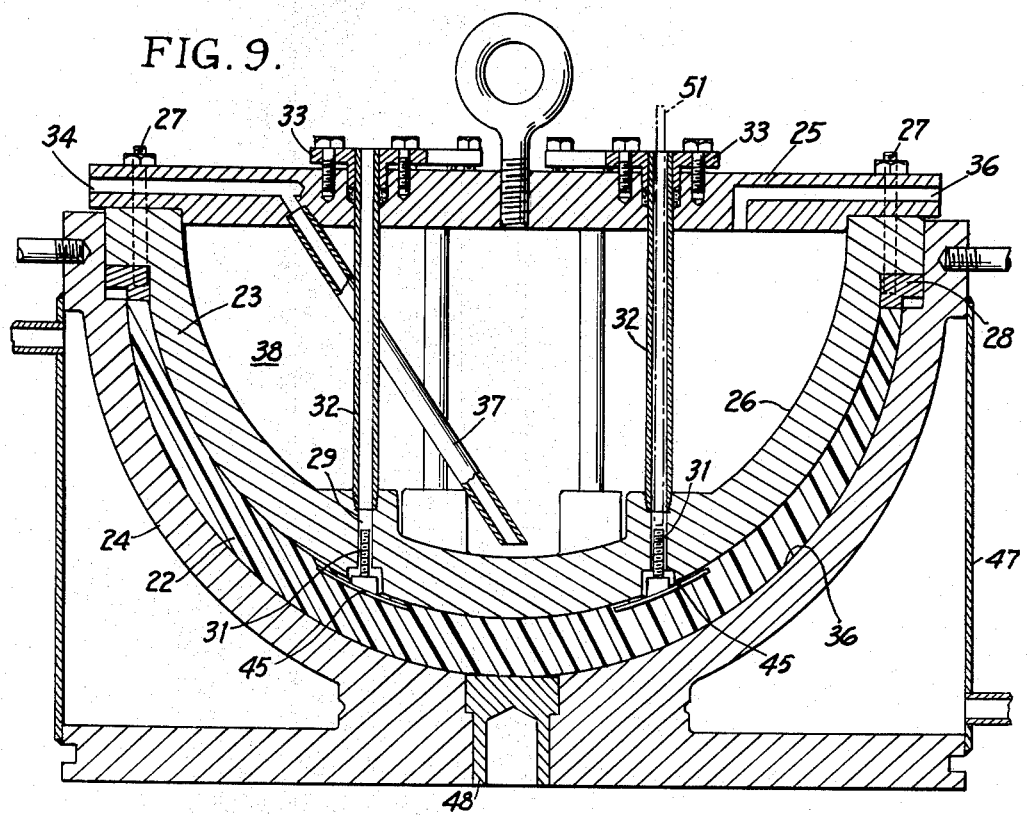
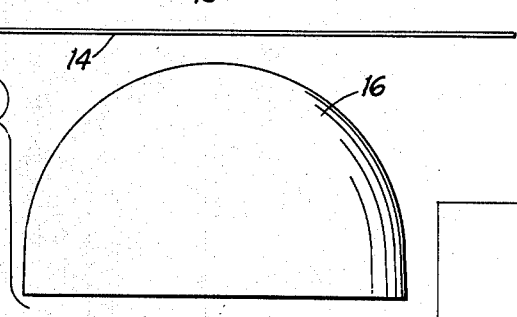
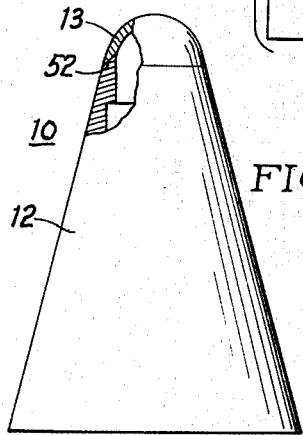
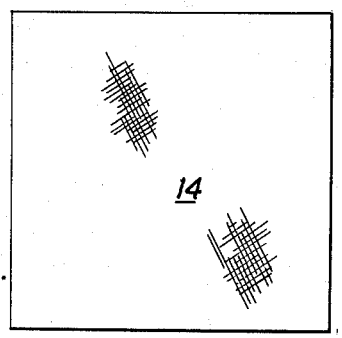
INVENTOR.
ELMER P. WARNKEN
BY Pearce & Schaeperklaus
ATTORNEYS Dec. 21, 1965 E. P. WARNKEN 3,224,374
NOSE CAP FOR A RE-ENTRY BODY
Filed March 9, 1960 3 Sheets-Sheet 3

INVENTOR.
ELMER P. WARNKEN
BY Pearce & Schaeperklaus
ATTORNEYS

United States Patent Office 3,224,374
Patented Dec. 21, 1965

3,224,374
NOSE CAP FOR A RE-ENTRY BODY
Elmer P. Warnken, Cincinnati, Ohio, assignor to Studebaker Corporation, a corporation of Michigan
Filed Mar. 9, 1960, Ser. No. 13,830
3 Claims. (Cl. 102—92.5)

This invention relates to resin-impregnated laminated articles. More particularly, this invention relates to a laminated, resin-impregnated cap for a hollow body or the like for use in locations where high fluid velocities are encountered.

In bodies which encounter very high fluid velocity, such as re-entry bodies for ballistic missiles which may be propelled to heights beyond the normal atmosphere levels and must return to the earth through the atmosphere, the very rapid passing thereof through the atmosphere causes very tremendous strains in the wall surface thereof and produces great amounts of heat on the surfaces of the walls. In my pending application, Serial No. 734,345, filed May 9, 1958, now Patent No. 3,081,705, is shown a laminated wall structure for a re-entry body. An object of this invention is to provide a laminated cap for a wall structure of the type shown in my aforesaid pending application which cap structure is adapted to withstand great heat and stresses of the type encountered by re-entry bodies.

A further object of this invention is to provide a laminated cap structure of dome shape in which a plurality of laminations of progressively decreasing diameter are formed into a dome shape with narrow edge portions of the laminations being exposed and major portions of the laminations being overlapped by adjacent laminations.

A further object of this invention is to provide a dome-shaped cap structure of this nature in which each of the laminations is molded in dome shape with edges of the laminations exposed and in which the outer or exposed edge portions of the laminations are neither parallel to nor perpendicular to the direction of fluid flow but slope with regard to the direction of fluid flow with the laminations overlapping in such a manner that the high velocity fluid passing the edges of the laminations tends to cause the laminations to lie flatwise against each other and to resist the tendency for crack formation therebetween.

A further object of this invention is to provide a cap structure of this type in which the direction of heat flow along the laminations does not lead to the interior of the cap but along the dome thereof so that the heat transfer through the cap is resisted.

The above and other objects and features of the invention will be apparent to those skilled in the art to which this invention pertains from the following detailed description and the drawings, in which:

FIG. 1 is a view in side elevation of a nose cone for a re-entry body having a cap constructed in accordance with an embodiment of this invention, parts of the body and of the cap being broken away to reveal interior construction;

FIG. 2 is a view in side elevation showing a mandrel on which a portion of the cap is formed together with one of the laminations of the cap before molding onto the mandrel;

FIG. 3 is a plan view of one of the laminations before molding upon the mandrel;

FIG. 9 is a view in transverse section of mold sections with laminations in place therebetween in position for molding.

In the following detailed description, and the drawings, like reference characters indicate like parts.

In FIG. 1 is illustrated a re-entry nose cone 10 for a ballistic missile constructed in accordance with this invention. The nose cone includes a body 12 and a cap 13, the cap being constructed in accordance with an embodiment of this invention. The nose cone is used as a part of a missile which is projected to a height above the normal atmosphere, and the nose cone is adapted to re-enter the atmosphere. The nose cone can be attached to a body of the missile (not shown) in any appropriate manner.

Figure 4:
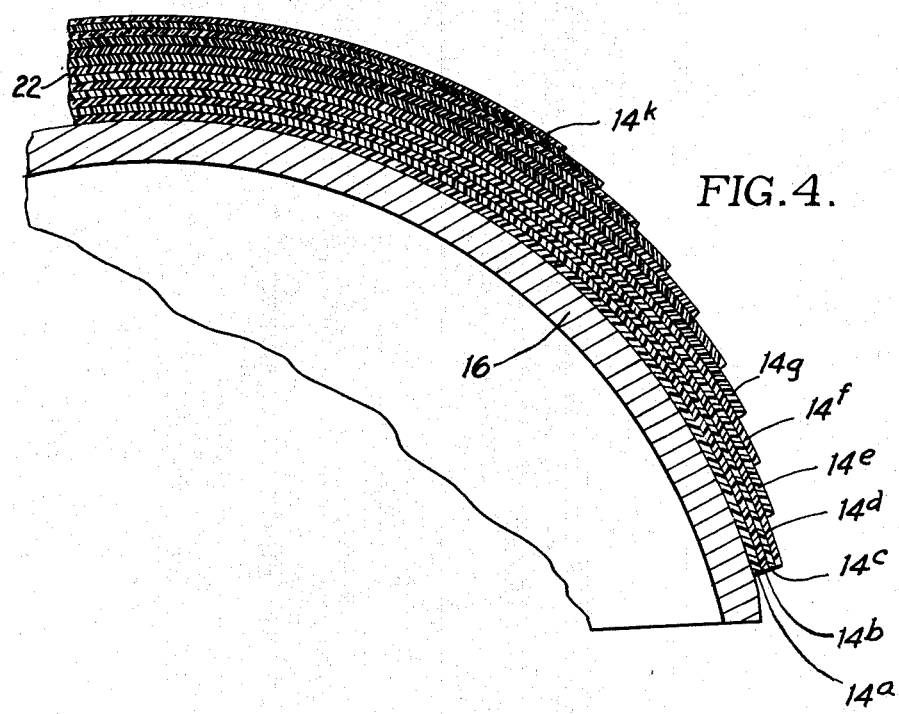
FIG. 4 is an enlarged fragmentary view in section of a portion of the mandrel illustrated in FIG. 3 with laminations positioned thereon.

The cap is built up of a plurality of laminations 14, one of which is shown in FIGS. 2 and 3. The laminations are formed of resin-impregnated glass fiber cloth or the like. The laminations can be formed of glass fiber cloth or asbestos fiber cloth or other heat-resistant fibrous materials or the like. The laminations are impregnated with a suitable thermosetting resin, such as a phenol-formaldehyde resin. The majority of the laminations are laid up upon a mandrel 16 (FIG. 2). Each lamination is heated to be softened sufficiently to be molded to the shape of the mandrel. The manner of laying up of the laminations is illustrated most clearly in FIGS. 4 and 5. Each lamination, after softening, is laid up upon the mandrel, in face-to-face relation with laminations theretofore mounted on the mandrel. The first lamination 14a engages the outer face of the mandrel. The next lamination 14b is mounted in face-to-face relation with the first lamination. A plurality of laminations of substantially equal length are mounted on the mandrel, as indicated at 14c and 14d in FIG. 4. Thereafter, additional laminations 14e, 14f, and 14g are mounted on the mandrel. After each of the laminations 14e, 14f, and 14g, is set in place, the edge thereof is cut away or trimmed so that each of the laminations 14e, 14f, and 14g, is of slightly lesser size and diameter than each preceding lamination and the laminations form a plurality of steps or offset portions mounted one upon the other. A final lamination 14k forms an outer layer at the central portion of the cap and terminates upon the slope thereof as illustrated most clearly in FIG. 4.

Figure 5:
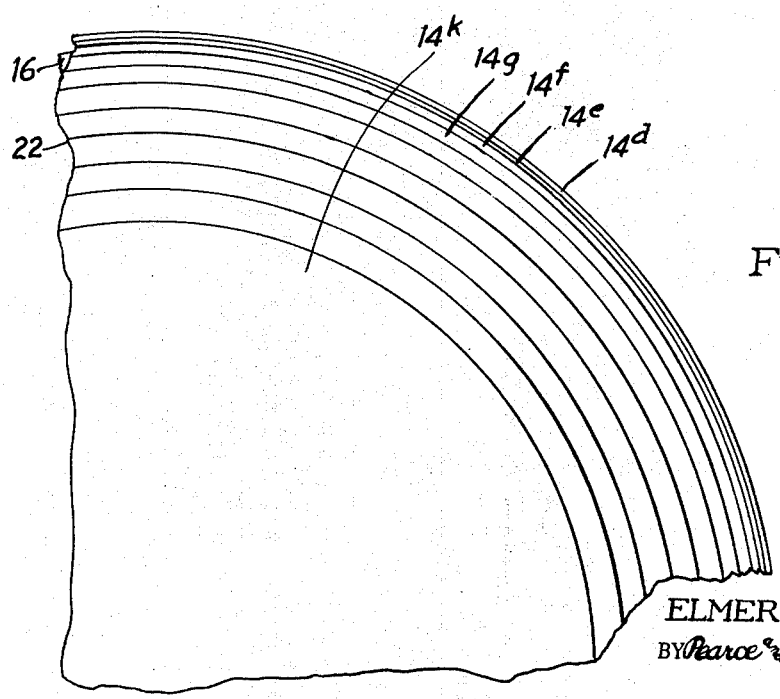
FIG. 5 is a fragmentary enlarged plan view of the portion of the mandrel illustrated in FIG. 4 with laminations shown in place thereon.
Figure 7:
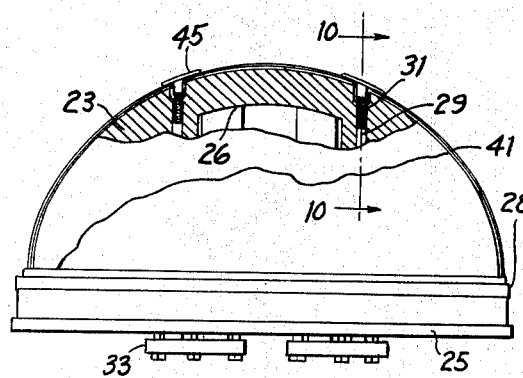
FIG. 7 is a view, partly in section and partly in side elevation, showing a mold member on which additional laminations are laid up, the mold being shown in association with additional laminations.
Figure 8:
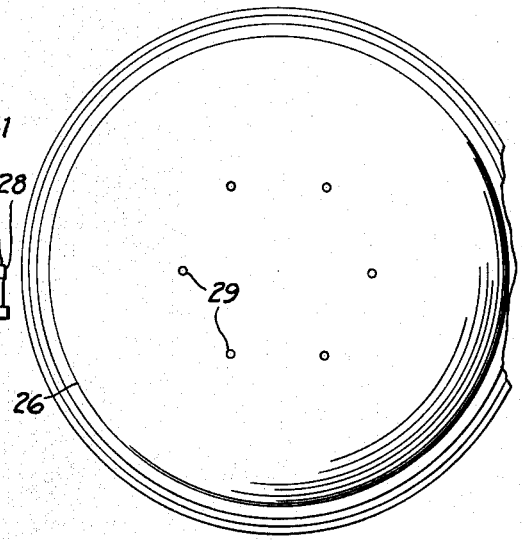
FIG. 8 is a plan view of the mold member illustrated in FIG. 7 with laminations omitted.

In the drawings, only a limited number of laminations are shown, but there can be a substantially greater number of laminations than are shown. For example, in a cap having a diameter of 25 inches, there can be approximately 55 laminations of substantially equal size and approximately 120 laminations of progressively reduced diameter with the final or terminal lamination 14k having a width of approximately 13 inches measured along the curve of the laminations. If desired, the laminations can be laid up in two or more sections, and the sections can be assembled after laying up. The sticky or tacky nature of the resin laminations, when heated to softness, causes the laminations to adhere to each other to form a unitary mass or pre-shaped unit 22 (FIGURE 5). The pre-shaped unit 22 is molded between inner and outer mold members 23 and 24 (see FIG. 9). Details of construction of the inner mold member 23 are shown in FIGS. 7, 8, and 9. The inner mold member includes a base plate 25 and a mold body 26 attached to the base plate 25 by studs 27 which extend into a ring 28. The mold body 26 has a shape generally conforming to the contour of the mandrel 16 (FIG. 2). As shown in FIGS. 7, 8, and 9, the mold body 26 has a plurality of bores 29 which, as shown in FIGS. 7 and 9, are adapted to receive the shanks of bolts 31. The bores 29 communicate with tubes 32 which are aligned therewith and extend through the base plate 25 to the exterior thereof. The tubes 32 are sealed to the base plate 25 by stuffing boxes 33. Channels 34 and 36 (FIGURE 9) in the base plate 25 and a steam tube 37 inside the hollow interior 38 of the inner mold member 23, permit introduction of steam or the like for heating the mold member.

Figure 10:
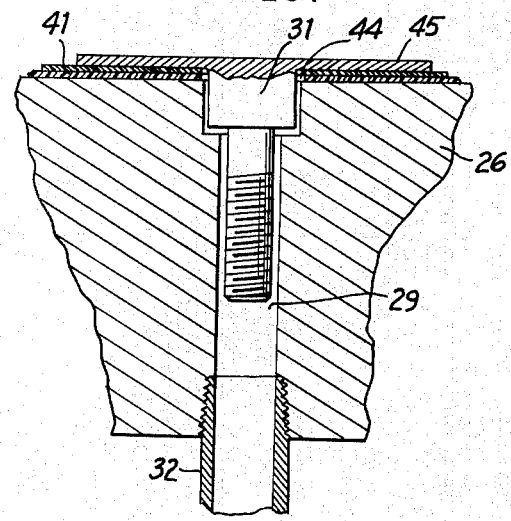
FIG. 10 is an enlarged view in section taken on the line 10—10 in FIG. 7.

In the building up of the laminations of the cap, a small number of initial laminations 41 (FIGURE 10) are first built up upon the mold body of the inner mold member 23, as shown most clearly in FIGS. 7 and 10, with the initial laminations overlying the bores 29. In the cap described above having a diameter of 25 inches, there can be five initial laminations. Openings 44 (FIG. 10) are cut in the initial laminations overlying the bores, and the bolts 31 are set in place therein. The bolts have relatively thin heads 45 which, as shown in FIG. 9, are shaped to follow the contour of the mold body 26. The pre-shaped unit 22 (FIG. 9) is positioned overlying the bolt heads and the initial laminations, and the laminations and the inner mold member 23 are mounted inside the outer mold member 24. The outer mold member 24 has a molding face 36 which engages the pre-shaped unit 22. A steam jacket 47 surrounds the molding face. A knock-out plug 48 is mounted in the center of the molding face 36.

When the mold members 23 and 24 have been assembled with the laminations therebetween, steam or other suitable heat transfer fluid is introduced into the steam jacket 47 of the outer mold member and into the hollow interior 38 of the inner mold member to heat the resin of the laminations and cure the resin. In addition, the mold members can be subjected to pressure by an appropriate press (not shown) to subject the laminations to suitable compression during molding and curing of the resin.

When the resin has been cured, the mold members are separated and appropriate knock-out pins, one of which is indicated in dot-dash lines at 51 in FIG. 9, can be inserted into the tubes 32 to engage the shanks of the bolts 31 in the bores 29 so that, when the knock-out pins are tapped with a hammer or the like, the molded cap can be released from the mold. If the cap adheres to the lower mold, the knock-out plug 48 can be tapped to release the cap therefrom.

Figure 6:
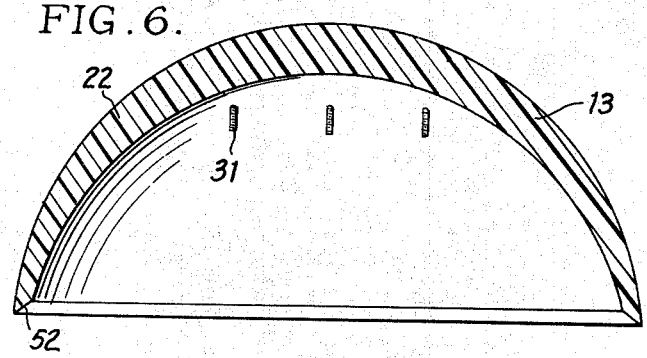
FIG. 6 is a view in transverse section of the completed nose cap.

When the cap has been removed from the mold, the edges thereof can be machined as indicated at 52 in FIG. 6 to provide a proper contour for engaging the edge of the body 12, as shown in FIG. 1.

The cap and method of forming the cap illustrated in the drawings and described above are subject to modification without departing from the spirit and scope of the appended claims.

Having described my invention what I claim is new and desire to secure by Letters Patent is:

1. A dome-shaped cap for a re-entry body or the like having a face for contact by fluid flow which comprises a plurality of resin-impregnated laminations of dome shape, said laminations including a first section of laminations of substantially equal diameter arranged in face-to-face overlying relationship and a second section overlying the first section, the laminations of the second section being of progressively decreasing diameter and being arranged in face-to-face relation, there being a minor edge portion of one face only of each lamination of the second section which is exposed at said cap face for trailing contact with fluid flow, a major portion of said lamination face being overlapped by an adjacent upstream lamination.

2. A dome-shaped cap for a re-entry body or the like having a face for contact by fluid flow which comprises a plurality of resin-impregnated laminations of dome shape, said laminations being of progressively decreasing diameter and being arranged in face-to-face relation, there being a minor edge portion of one face only of each lamination which is exposed at said cap face for trailing contact with fluid flow, a major portion of said lamination face being overlapped by an adjacent upstream lamination.

3. A dome-shaped cap for a re-entry body or the like having a face for contact by fluid flow which comprises a plurality of resin-impregnated laminations of dome shape, said laminations including a first section of laminations of substantially equal diameter arranged in face-to-face overlying relationship and a second section overlying the first section, the laminations of the second section being of progressively decreasing diameter and being arranged in face-to-face relation, there being a minor edge portion of one face only of each lamination of the second section which is exposed at said cap face for trailing contact with fluid flow, a major portion of said lamination face being overlapped by an adjacent upstream lamination, and a plurality of bolts, each of said bolts having a head received between laminations of the first section and a shank extending inwardly therefrom.

References Cited by the Examiner

UNITED STATES PATENTS

| | | | |
|---|---|---|---|
| 1,954,130 | 4/1934 | Higgins | 154—81 X |
| 2,827,412 | 3/1958 | McKay | 154—43 |
| 2,838,435 | 6/1958 | Hewett | 102—92.5 |
| 2,844,354 | 7/1958 | Warnken | 154—110 X |

BENJAMIN A. BORCHELT, *Primary Examiner.*

FRED C. MATTERN, Jr., CARL F. KRAFFT,
*Examiners.*